(12) United States Patent
Gagne et al.

(10) Patent No.: US 12,719,630 B2
(45) Date of Patent: Aug. 25, 2026

(54) CONDUCTIVE RF COMMUNICATION FOR HIGH RELIABILITY APPLICATIONS

(71) Applicant: QUALCOMM Incorporated, San Diego, CA (US)

(72) Inventors: Justin Joseph Rosen Gagne, San Diego, CA (US); Sandip Homchaudhuri, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 17/944,134

(22) Filed: Sep. 13, 2022

(65) Prior Publication Data

US 2024/0089048 A1 Mar. 14, 2024

(51) Int. Cl.
*H04L 5/00* (2006.01)
*H04W 72/0453* (2023.01)

(52) U.S. Cl.
CPC .......... *H04L 5/0048* (2013.01); *H04L 5/0092* (2013.01); *H04W 72/0453* (2013.01)

(58) Field of Classification Search
None
See application file for complete search history.

(56) References Cited

U.S. PATENT DOCUMENTS 6,571,082 B1 5/2003 Rahman et al.
10,367,260 B1 * 7/2019 Trocke .................. H01Q 1/523
2005/0053008 A1 3/2005 Griesing et al.
2010/0248660 A1 * 9/2010 Bavisi ................. H04B 1/0458 455/120
2016/0025795 A1 * 1/2016 Martin ................ G01R 31/006 324/503
2016/0170818 A1 * 6/2016 Zhu ...................... G06F 11/079 702/185
2017/0125892 A1 * 5/2017 Arbabian ............ A61B 5/0024
2018/0048512 A1 2/2018 Zeng et al.
2018/0131502 A1 * 5/2018 Askar .................... H04B 1/401
2019/0253922 A1 * 8/2019 Jain ................. H04B 10/25752
2020/0329099 A1 * 10/2020 Liberti ................. H04L 5/0035
2021/0153073 A1 * 5/2021 Hardik .................. H04B 1/525
2021/0175925 A1 * 6/2021 Tarighat Mehrabani .................... H04B 3/36
2021/0234609 A1 * 7/2021 Rutt .................. H04B 7/18513
2023/0095653 A1 * 3/2023 Jain ........................ H03F 1/223 455/341
2023/0136683 A1 * 5/2023 Lee ...................... H04W 40/32 370/254
2023/0378649 A1 * 11/2023 Fenn ............... H04B 10/25759

(Continued)

FOREIGN PATENT DOCUMENTS

CN 114954971 A 8/2022

OTHER PUBLICATIONS

International Search Report and Written Opinion—PCT/US2023/073978—ISA/EPO—Jan. 3, 2024.

*Primary Examiner* — Phirin Sam
(74) *Attorney, Agent, or Firm* — Patterson + Sheridan, L.L.P.

(57) ABSTRACT

Certain aspects of the present disclosure provide a system for processing data, comprising a plurality of processing nodes, each processing node comprising at least one processor and at least one radio frequency (RF) chain and at least one link for conductive RF communication between or among the processing nodes using a wireless communications protocol.

24 Claims, 9 Drawing Sheets

(56) References Cited

U.S. PATENT DOCUMENTS

| | | | | |
|---|---|---|---|---|
| 2024/0297809 | A1* | 9/2024 | Furtek | H04L 25/067 |
| 2025/0079695 | A1* | 3/2025 | Hong | H01Q 1/243 |
| 2025/0088287 | A1* | 3/2025 | Zhang | H04B 1/48 |

* cited by examiner

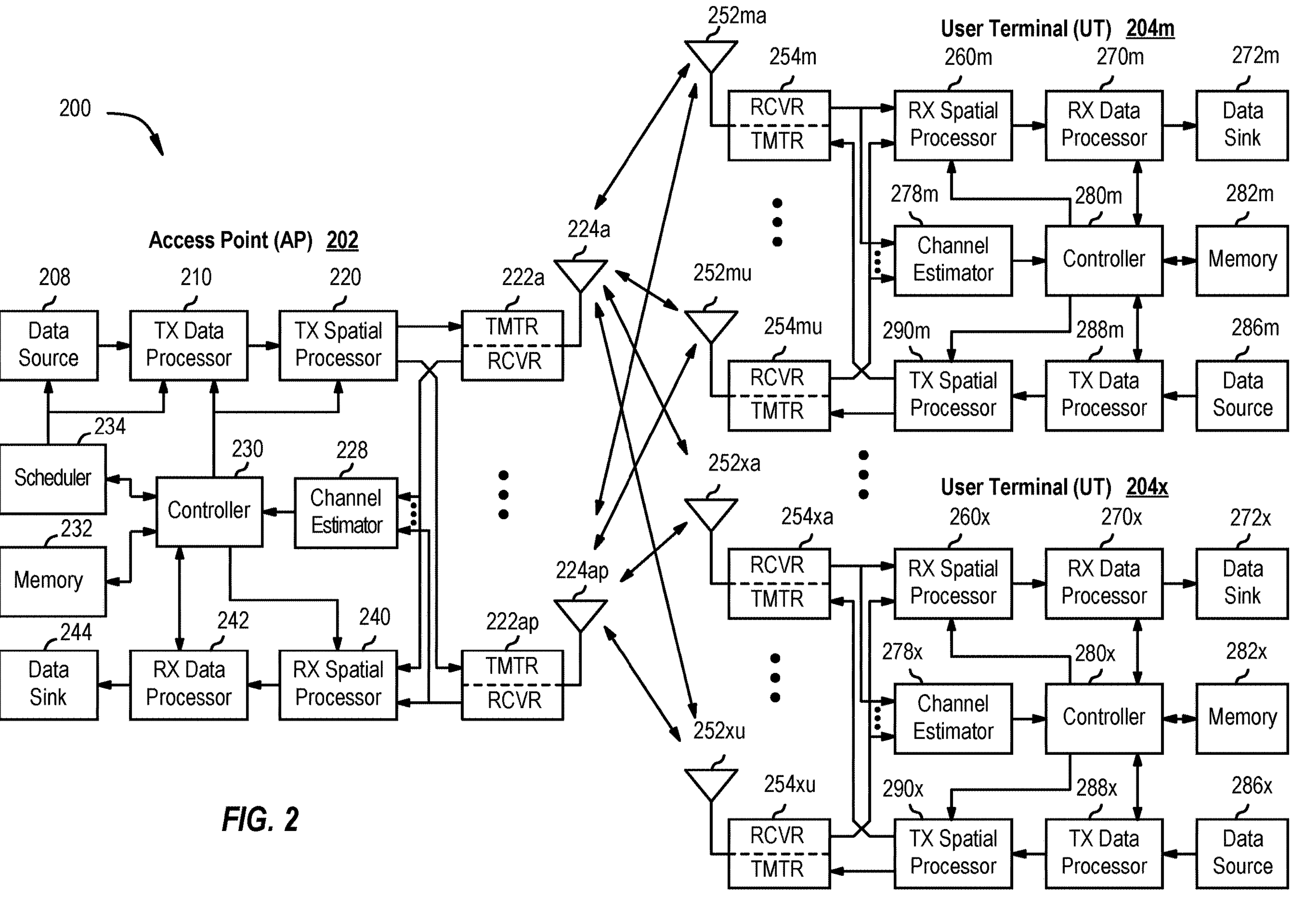
200
Access Point (AP) 202
208
Data Source
210
TX Data Processor
220
TX Spatial Processor
222a
TMTR
RCVR
224a
234
Scheduler
230
Controller
228
Channel Estimator
232
Memory
244
Data Sink
242
RX Data Processor
240
RX Spatial Processor
222ap
TMTR
RCVR
224ap
252ma
User Terminal (UT) 204m
254m
RCVR
TMTR
260m
RX Spatial Processor
270m
RX Data Processor
272m
Data Sink
278m
Channel Estimator
280m
Controller
282m
Memory
252mu
254mu
RCVR
TMTR
290m
TX Spatial Processor
288m
TX Data Processor
286m
Data Source
252xa
User Terminal (UT) 204x
254xa
RCVR
TMTR
260x
RX Spatial Processor
270x
RX Data Processor
272x
Data Sink
278x
Channel Estimator
280x
Controller
282x
Memory
252xu
254xu
RCVR
TMTR
290x
TX Spatial Processor
288x
TX Data Processor
286x
Data Source
FIG. 2

Figure 3:
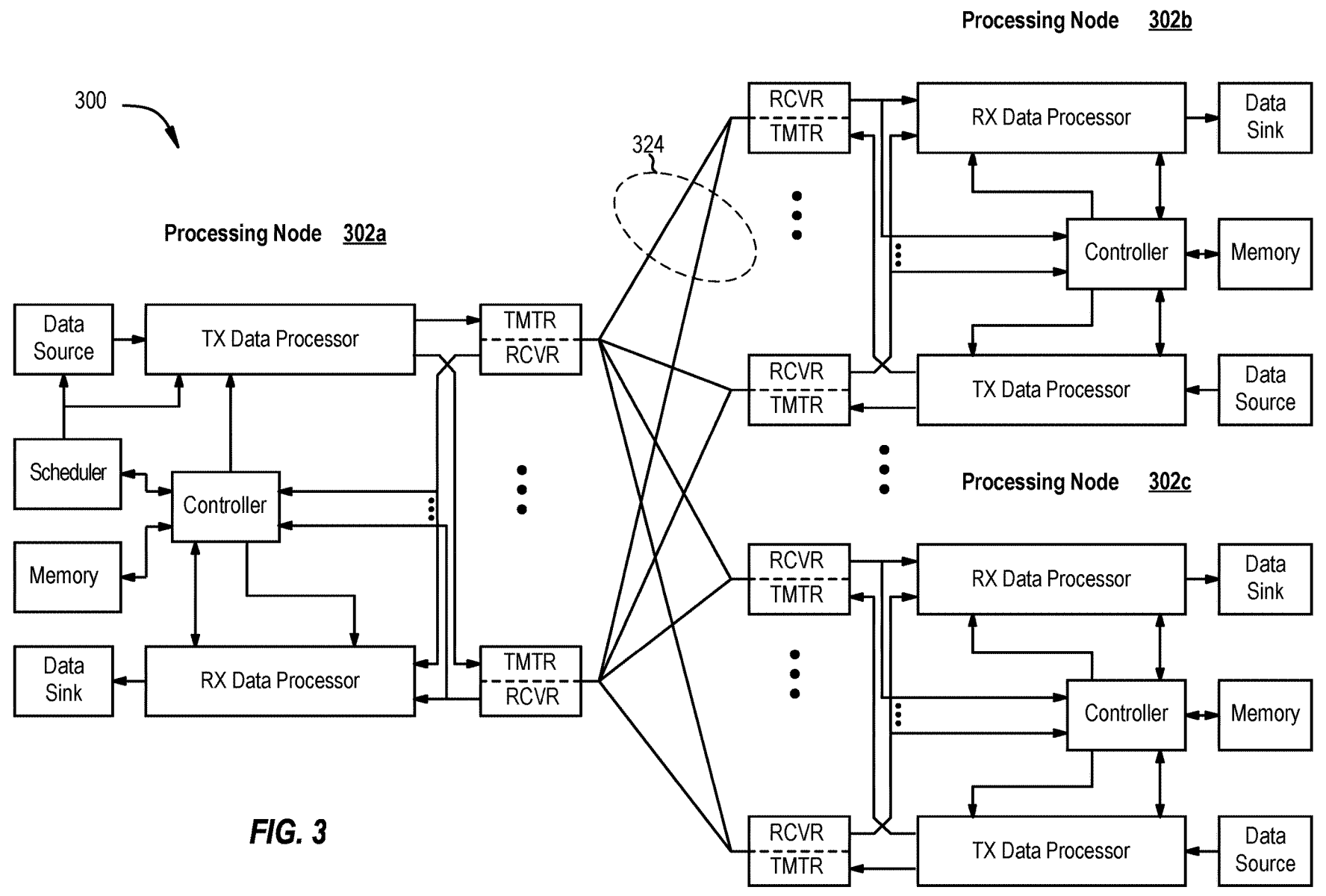

300

Processing Node 302a

Data Source
Scheduler
Memory
Data Sink
TX Data Processor
Controller
RX Data Processor
TMTR RCVR
TMTR RCVR

324

Processing Node 302b

Data Sink
Memory
Data Source
RX Data Processor
Controller
TX Data Processor
RCVR TMTR
RCVR TMTR Processing Node 302c Data Sink
Memory
Data Source
RX Data Processor
Controller
TX Data Processor
RCVR TMTR
RCVR TMTR

CONDUCTIVE RF COMMUNICATION FOR HIGH RELIABILITY APPLICATIONS

BACKGROUND

Field of the Disclosure

Aspects of the present disclosure relate to communications, and more particularly, to techniques for performing radio frequency (RF) communication via a conductive medium.

Description of Related Art

Communications networks are widely deployed to provide various communications services such as voice, video, packet data, messaging, broadcast, etc. These networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communications systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (such as tens of meters to a few hundred meters).

SUMMARY

One aspect provides a system for processing data. The system includes a plurality of processing nodes, each processing node comprising at least one processor and at least one radio frequency (RF) chain, and at least a first one link for conductive RF communication between or among the processing nodes using a wireless communications protocol.

Other aspects provide: an apparatus operable, configured, or otherwise adapted to perform any one or more of the aforementioned methods and/or those described elsewhere herein; a non-transitory, computer-readable media comprising instructions (e.g., processor-executable instructions) that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 2 depicts example components of devices in a wireless communication system.

FIG. 3 depicts example components of devices in a communication system capable of radio frequency (RF) communication via a conductive medium, in accordance with aspects of the present disclosure.

DETAILED DESCRIPTION

Figure 1:
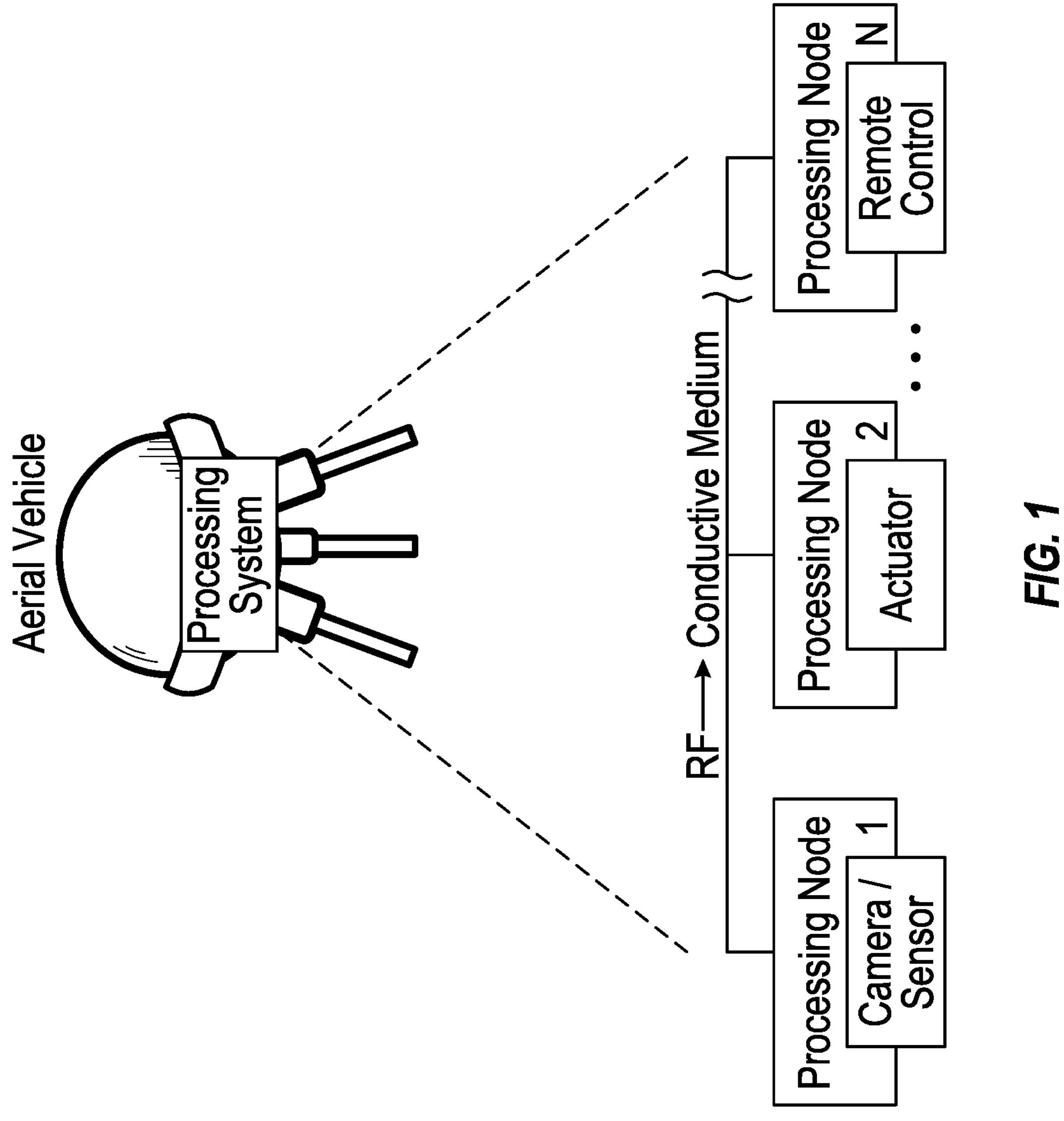
FIG. 1 depicts a diagram illustrating an example processing system, in accordance with aspects of the present disclosure.

Aspects of the present disclosure provide apparatuses, methods, processing systems, and computer-readable mediums for performing radio frequency (RF) communication via a conductive medium.

Communication systems configured for certain use cases require high reliability (high-rel) characteristics. Examples of such use cases include communication systems deployed for medical, public safety, industrial robots, and unattended infrastructure applications. As another example use case, shown in FIG. 1, space navigation and avionics may require high reliability to ensure performance and safety for applications such as entry descent and landing functions.

In such applications, redundancy is typically desirable to account for the variety of faults that could occur. For example, in a multi-processor deployment, it may be desirable to provide redundancy so that if one processor fails for some reason, another processor can take over. This is especially important in certain applications, such as during entry descent and landing maneuvers where a large amount of video data may be processed. In general, the more important an application or mission (e.g., as measured by overall cost, longevity, or safety), the more desirable it is to incorporate features to ensure the application or mission can continue after and/or during a failure.

Some approaches to provide communication between processors utilize network-based protocols and interfaces, such as peripheral component interconnect express (PCIe) or Ethernet). Unfortunately, in such systems, all communications are typically routed through interface devices, referred to as hub chips. As such, a hub chip represents a single point of failure, meaning if that device fails, all communication between processors may fail. In other systems, point-to-point links between nodes may be used to route around faults. Such systems suffer scalability issues, as the number of links increase non-linearly with respect to the number of nodes (e.g., 3 links for 3 nodes, but 6 links for 4 nodes).

In some cases, redundant buses may be used to accommodate certain types of faults. Such faults may include a bus shorting to ground or power or a chip failing for some reason. If redundant buses are used, if a fault occurs on one bus, the system may switch over to another bus. Some types of buses may tolerate certain types of shorts, but such buses are typically low bandwidth and may not be suitable for applications that require high bandwidth, such as the sharing of video feeds.

While wireless RF communication systems may address some of the issues above (e.g., with no shorts and greater scalability), intra-craft communication systems tend to use wired connections only. Further, in some use cases, there may be a concern about RF emissions jamming sensitive instruments (e.g., radio astronomy equipment). In some cases, there may also be security concerns due to the potential detectability of RF signatures (e.g., a device or craft may be detected or identified by an RF signature).

Aspects of the present disclosure provide techniques that may provide high reliability for various use cases, such as those described above. For example, as illustrated in FIG. 1, the techniques may provide reliable links between processing nodes using radio frequency (RF) communication via a conductive medium. The techniques may allow for the utilization of wireless communications protocols, but with added reliability and advantages of "wired" communication via the conductive medium. The conductive RF communications proposed herein may accommodate heterogeneous nodes (e.g., cameras, sensors, actuators, remote controls, as shown in FIG. 1, user interface terminals, or communication links for interfacing outside the system), while providing collision management via various mechanisms.

Using wired (conductive) RF communication instead of wireless (radiative) RF communication may address issues associated with poor radiated signals (e.g., particularly on metal craft). In some cases, redundant links (buses) for conductive RF communication may have a benefit that the number of links do not need to scale with the number of nodes. Additionally, conductive RF communications may have reduced multipath properties, which may allow for guard interval reduction and corresponding increases in throughput. Conductive RF communications may also allow for transmission spectral mask tightening for transmission power increases, reception channel selectivity, and more aggressive modulation and coding schemes (MC S) for increased efficiency with comparable reliability.

Introduction to Wireless Communications Networks

Various aspects of the disclosure are described more fully hereinafter with reference to the accompanying drawings. This disclosure may, however, be implemented in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be implemented by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wired and wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communications systems, including communications systems that are based on an orthogonal multiplexing scheme. Examples of such communications systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (such as implemented within or performed by) a variety of wired or wireless apparatuses (such as nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (such as a cellular phone or smart phone), a computer (such as a laptop), a tablet, a portable communications device, a portable computing device (such as a personal data assistant), an entertainment device (such as a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (such as a wide area network such as the Internet or a cellular network) via a wired or wireless communications link.

Example Wireless Communications Systems

FIG. 2 illustrates a block diagram of AP 110 and two wireless STAs 120*m* and 120*x* in a MEVIO/MLO system, such as system 100, in accordance with certain aspects of the present disclosure. In certain aspects, AP 110 and/or wireless STAs 120*m* and 120*x* may perform various techniques to ensure that a non-AP MLD is able to receive a group addressed frame. For example, AP 110 and/or wireless STAs 120*m* and 120*x* may include a respective association manager as described herein with respect to FIG. 1.

AP 110 is equipped with Nap antennas 224*a* through 224*t*. Wireless STA 120*m* is equipped with $N_{sta,m}$ antennas 252*ma* through 252*mu*, and wireless STA 120*x* is equipped with $N_{sta,x}$ antennas 252*xa* through 252*xu*. AP 110 is a transmitting entity for the DL and a receiving entity for the UL. Each wireless STA 120 is a transmitting entity for the UL and a receiving entity for the DL. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "DL" denotes the downlink, the subscript "UL" denotes the uplink, $N_{UL}$ wireless STAs are selected for simultaneous transmission on the uplink, $N_{DL}$ wireless STAs are selected for simultaneous transmission on the downlink, $N_{UL}$ may or may not be equal to $N_{DL}$, and $N_{UL}$ and $N_{DL}$ may be static values or can change for each scheduling interval. The beam-steering or some other spatial processing technique may be used at the access point and wireless station.

On the UL, at each wireless STA 120 selected for UL transmission, a transmit (TX) data processor 288 receives traffic data from a data source 286 and control data from a controller 280. TX data processor 288 processes (e.g., encodes, interleaves, and modulates) the traffic data for the wireless station based on the coding and modulation schemes associated with the rate selected for the wireless STA and provides a data symbol stream. A TX spatial processor 290 performs spatial processing on the data symbol stream and provides $N_{sta,m}$ transmit symbol streams for the $N_{sta,m}$ antennas. Each transceiver (TMTR) 254 receives and processes (e.g., converts to analog, amplifies, filters, and frequency upconverts) a respective transmit symbol stream to generate an uplink signal. $N_{sta,m}$ transceivers 254 provide $N_{sta,m}$ UL signals for transmission from $N_{sta,m}$ antennas 252 to AP 110.

$N_{UL}$ wireless STAs may be scheduled for simultaneous transmission on the uplink. Each of these wireless STAs performs spatial processing on its data symbol stream and transmits its set of transmit symbol streams on the UL to the AP 110.

At AP 110, $N_{ap}$ antennas 224*a* through 224*ap* receive the UL signals from all NUI, wireless STAs transmitting on the UL. Each antenna 224 provides a received signal to a respective transceiver (RCVR) 222. Each transceiver 222 performs processing complementary to that performed by transceiver 254 and provides a received symbol stream. A receive (RX) spatial processor 240 performs receiver spatial processing on the $N_{ap}$ received symbol streams from $N_{ap}$ transceiver 222 and provides $N_{UL}$ recovered UL data symbol streams. The receiver spatial processing is performed in accordance with the channel correlation matrix inversion (CCMI), minimum mean square error (MMSE), soft interference cancellation (SIC), or some other technique. Each recovered UL data symbol stream is an estimate of a data symbol stream transmitted by a respective wireless station. An RX data processor 242 processes (e.g., demodulates, deinterleaves, and decodes) each recovered uplink data symbol stream in accordance with the rate used for that stream to obtain decoded data. The decoded data for each wireless STA may be provided to a data sink 244 for storage and/or a controller 230 for further processing.

On the DL, at AP 110, a TX data processor 210 receives traffic data from a data source 208 for $N_{DL}$ wireless stations scheduled for downlink transmission, control data from a controller 230, and possibly other data from a scheduler 234. The various types of data may be sent on different transport channels. TX data processor 210 processes (e.g., encodes, interleaves, and modulates) the traffic data for each wireless station based on the rate selected for that wireless station. TX data processor 210 provides $N_{DL}$ DL data symbol streams for the $N_{DL}$ wireless stations. A TX spatial processor 220 performs spatial processing (such as a precoding or beamforming, as described in the present disclosure) on the $N_{DL}$ DL data symbol streams, and provides $N_{ap}$ transmit symbol streams for the $N_{ap}$ antennas. Each transceiver 222 receives and processes a respective transmit symbol stream to generate a DL signal. $N_{ap}$ transceivers 222 providing $N_{ap}$ DL signals for transmission from $N_{ap}$ antennas 224 to the wireless STAs.

At each wireless STA 120, $N_{sta,m}$ antennas 252 receive the $N_{ap}$ DL signals from access point 110. Each transceiver 254 processes a received signal from an associated antenna 252 and provides a received symbol stream. An RX spatial processor 260 performs receiver spatial processing on $N_{sta,m}$ received symbol streams from $N_{sta,m}$ transceiver 254 and provides a recovered DL data symbol stream for the wireless station. The receiver spatial processing is performed in accordance with the CCMI, MMSE or some other technique. An RX data processor 270 processes (e.g., demodulates, deinterleaves and decodes) the recovered DL data symbol stream to obtain decoded data for the wireless station.

At each wireless STA 120, a channel estimator 278 estimates the DL channel response and provides DL channel estimates, which may include channel gain estimates, SNR estimates, noise variance and so on. Similarly, a channel estimator 228 estimates the UL channel response and provides UL channel estimates. Controller 280 for each wireless STA typically derives the spatial filter matrix for the wireless station based on the downlink channel response matrix $H_{dn,m}$ for that wireless station. Controller 230 derives the spatial filter matrix for the AP based on the effective UL channel response matrix $H_{up,eff}$. Controller 280 for each wireless STA may send feedback information (e.g., the downlink and/or uplink eigenvectors, eigenvalues, SNR estimates, and so on) to the AP. Controllers 230 and 280 also control the operation of various processing units at AP 110 and wireless STA 120, respectively.

Example Wired RE Communications Systems

As illustrated in FIG. 3, aspects of the present disclosure may provide reliable links between processing nodes 302 using radio frequency (RF) communication via a conductive paths 324. The techniques may allow for the utilization wireless communications protocols, but with the added reliability and advantages of "wired" communication via the conductive medium.

As shown in FIG. 3, the techniques may also allow for the use of same or similar components as those described above with reference to FIG. 2, but with certain changes. For example, in FIG. 3, conductive paths 324 may replace antennas, while channel estimators, and spatial (Tx and Rx) processors may not be needed for conductive RF communications.

Processing nodes 302 may be examples of processing nodes (1, 2, . . . N) shown in FIG. 1. While three processing nodes are shown (302*a*, 302*b*, and 302*c*) in FIG. 3 for illustrative purposes, any number of processing nodes (including redundant nodes) may communicate using conductive RF communications, depending on the use case and/or particular implementation.

Aspects Related to Conductive RF Communications

Aspects of the present disclosure provide techniques that may provide high reliability for various use cases, such as processing for launch and/or landing maneuvers for spacecraft. The techniques may provide reliable links between processing nodes using conductive RF communications. As noted above, conductive RF communications may allow for the utilization of wireless communications protocols, but with added reliability and advantages of "wired" communication via the conductive medium.

The processing nodes may provide redundancy, for example, allowing one processing node to take over in the event another processing node fails or goes off-line for some reason (e.g., fails due to a short in the bus, thermal issue, or to perform a reboot). The conductive RF paths may also be designed to tolerate various types of shorts and multiple buses may provide redundant paths (and some RF signal energy may "jump" small breaks in the wire/conductive path). The conductive RF communications proposed herein may accommodate heterogeneous nodes, while providing collision management via various mechanisms.

Using conductive RF communication instead of radiative RF communication may address issues associated with poor radiated signals. In some cases, conductive RF communications may have reduced multipath properties, which may allow for guard interval reduction and corresponding increases in throughput. Conductive RF communications may also allow for transmission spectral mask tightening for transmission power increases, reception channel selectivity, and rate adaptations for increased reliability and efficiency.

Figure 4:
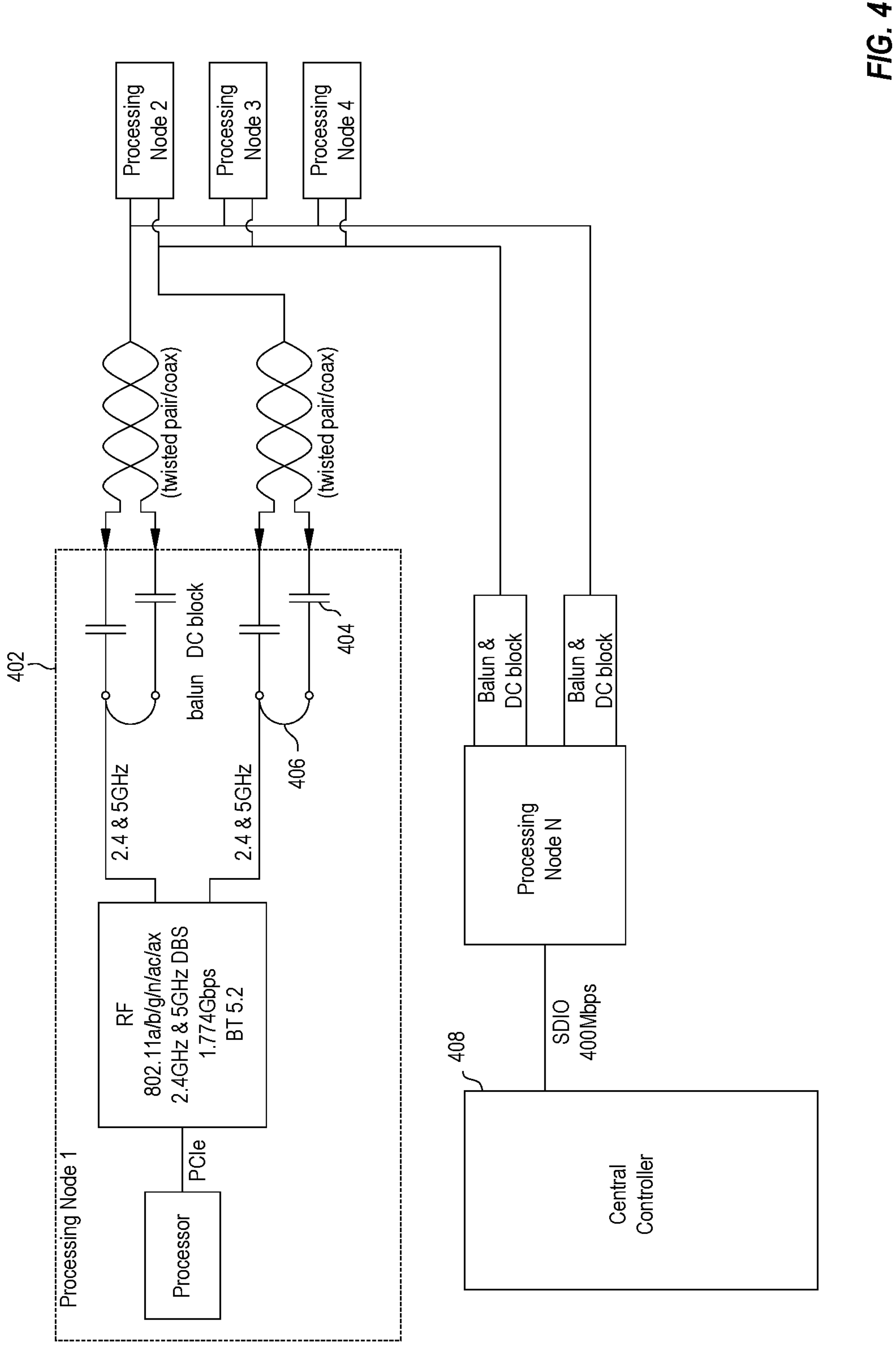
FIG. 4 depicts an example conductive RF architecture, in accordance with aspects of the present disclosure.

FIG. 4 illustrates one example of a system that utilized conductive RF communications between processing nodes 402. Each processing node may include at least one processor and at least one radio frequency (RF) chain. Each processing node may be implemented as a system on a chip (SoC). Each processing node may essentially act as a processing subsystem and may perform independent processing (different processing than other nodes) and/or may perform redundant processing (e.g., the same or similar processing as other nodes). In some cases, a central controller 408 may be included that serves as a host (e.g., that may configure and/or manage communication between the processing nodes).

As illustrated, in some cases, a direct current (DC) blocking circuit 404 may be coupled with one or more of the links. The DC blocking circuit may help address shorted wires (or damaged chip) and may prevent faults (e.g., faults in silicon/devices). In some cases, a balanced to unbalanced (balun) circuit 406 may be coupled with one or more of the links. A balun circuit generally refers to a (two-port) component that may be placed between a source and load when a differential, balanced RF functional block connects to a single-ended, ground-referenced functional block.

In the illustrated example, there are two links (e.g., buses) for conductive RF communication between or among the processing nodes. In some cases, the RF communication may be performed using a wireless communications protocol. In some cases, the RF chain include a device, such as an 802.11 (WiFi) compliant device, that has components to transmit and receive over two channels. In some cases, each link may be implemented as a coaxial cable and/or twisted pair, which may reduce wiring between processing nodes.

In some cases, the links may support different frequency bands. For example, the links may support two frequencies 2.4 GHz and 5 GHz (and/or 6 GHz for some devices), which may provide some flexibility. For example, if a device (e.g., one of the processing nodes or an external device) were to start transmitting on 2.4 GHz that causes noise on the bus, one or more of the processing nodes could recognize this and switch to 5 GHz to avoid the noise. Further, if one of the links breaks, the devices could switch to the other link.

In some cases, at least one of the processing nodes may be configured to send redundant packets on multiple links. In such cases, the redundant packets may include markers to identify them as redundant. In this manner, processing nodes may automatically introduce redundancy and reliability in transmissions by sending the same data stream. For example, if one processing node is exchanging video content with another processing node or the central controller, some video content may be sent over the 2.4 GHz band, while the same duplicate packets may be sent on the 5 GHz band and the redundant packets may be aggregated. In some cases, the processing nodes may mark the redundant packets with a cookie. Based on the cookies, a receiver may drop one of the redundant packets (e.g., which came in later or the first) and adopt the other.

As noted above, a non-radiated RF channel may have benefit from a lack of multipath and scattering. As a practical matter, this may translate into fewer taps of a channel impulse response (CIR) and a very static and deterministic channel response. Thus, the time-varying CIR that a typical Non-Line-of-Sight (NLOS) channel exhibits in radiated RF transmissions may be absent, resulting in and an almost time-invariant, very dense CIR, possibly with just a couple of taps representative of any cross talk in the coaxial/twisted pair.

Figure 5:
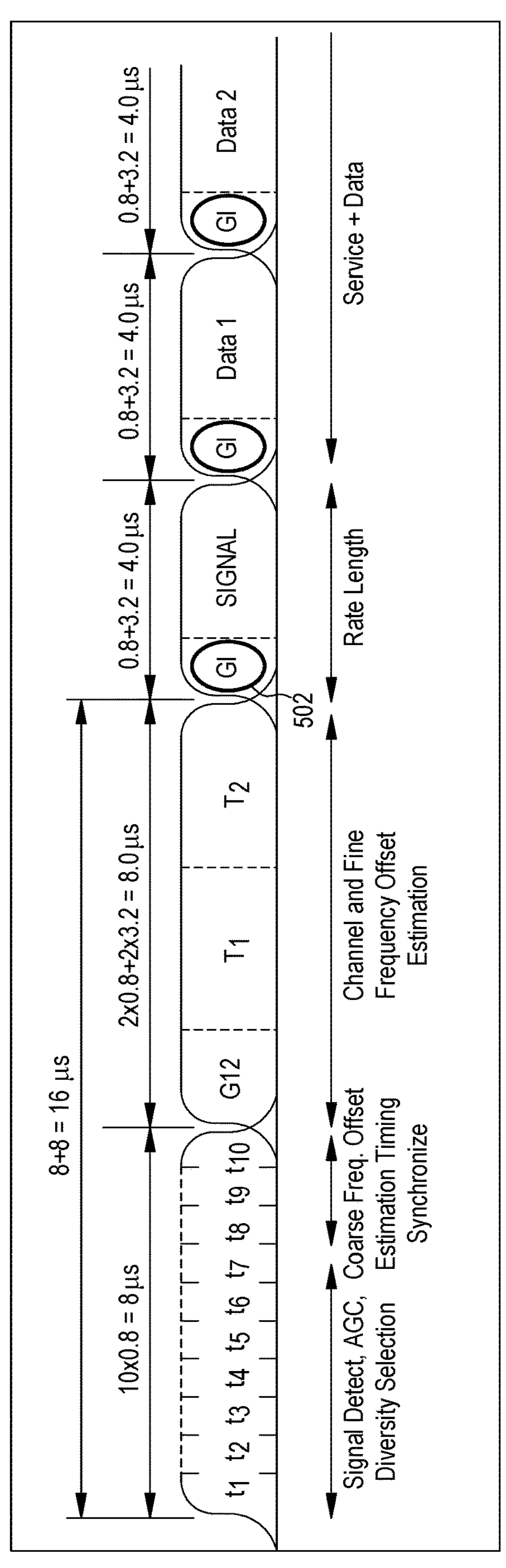
FIG. 5 depicts a timing diagram illustrating example guard intervals.

This knowledge of reduced multipath may allow for a guard interval (GI) reduction (e.g., smaller than GI associated with radiative RF communications) and corresponding throughput increase. For example, as illustrated in FIG. 5, while typical radiative RF communication may result in a relative long GI (e.g., GI2), the reduced multipath of conductive RF communications may allow for a reduced GI 502 (or no GI). Not having to account for a long GI in the orthogonal frequency-division multiplexing (OFDM) symbol, may effectively increasing performance throughput (e.g., by 10% or more) by operating in a Short GI, which increases the information content with every OFDM symbol.

Reduced multipath may also allow for transmission spectral mask tightening for transmission power increase, which may lead to higher reliability. In other words, by having less multipath and therefore less per OFDM inter-symbol interference (ISI) creep in, the transmit (Tx) finite impulse response (FIR) taps may be adjusted to tighten the spectral mask of the outgoing transmission and thereby increase the allowable Tx power on the link(s). Reduced multipath may also result in better Rx channel selectivity. In other words, the receive (Rx) FIR taps on the receiver can be adjusted to increase the filter response of the incoming signal without worrying about group delay of added taps encroaching into the adjacent symbol causing ISI, as the channel itself is multipath free. This increases signal reliability on Rx side. In some cases, the number of taps of the FIR filter, on transmit and receive, is adapted to have more taps based on the channel dispersion length computed from the guard intervals of OFDM symbols.

Conductive RF communication may also allow for improved and more aggressive rate adaptation schemes, without losing reliability. For example, knowing that the channel has practically no over the air (OTA) collision and no multipath may allow the processing nodes to operate with aggressive modulation coding schemes MCS to achieve higher rates, without having to drop down rates rapidly due to any unforeseen events of packet drops (or non-acknowledgements). A receiver may operate in a narrow window with fast recovery to peak MCS rates as opposed to the default MCS0-MCS15 window. In other words, the conductive RF communication between the processing nodes may involve a smaller subset of (upper/higher value) MCS rates to improve throughput and latency in the conductive channel environment.

Figure 6:
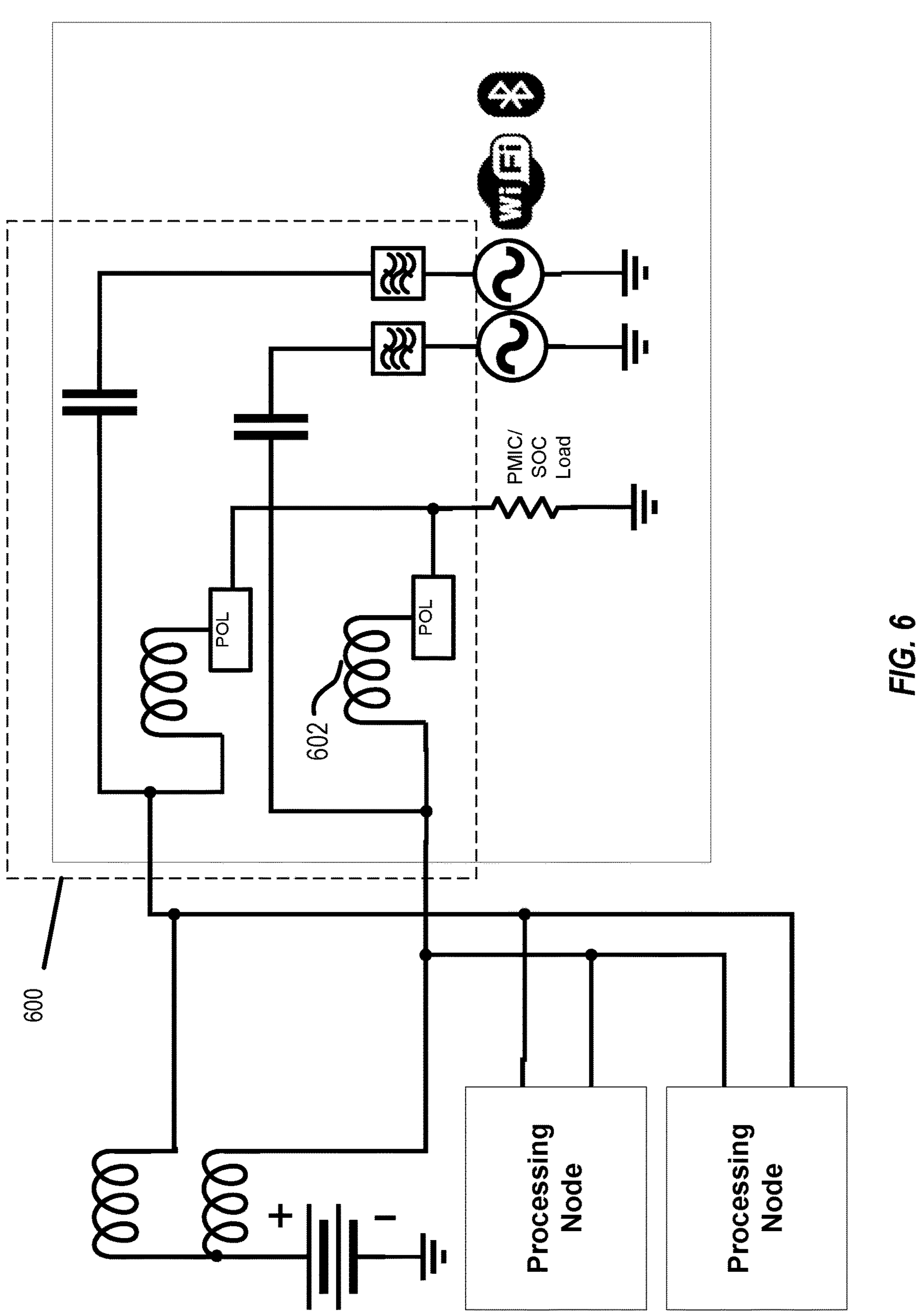
FIG. 6 depicts a circuit diagram illustrating a power source providing power to processing nodes, in accordance with aspects of the present disclosure.

As illustrated in FIG. 6, in some cases, at least one of the processing nodes may be configured with circuitry 600 to obtain operating power from one of the conductive links. In such cases, the processing nodes may include at least one element to prevent RF energy from shunting into power supply circuitry, such as an inductor 602 or a ferrite bead.

In some cases, one or more of the processing nodes may be configured to detect a fault indicative of a breakage to the network graph of connected processing nodes. For example, if one processing node has a breakage (or damaged balun or break in the conductive link) that processing node may continue to transmit and that will end up radiating in the environment as the conductive link (coax/pair) may act as an antenna. One approach to detect such a fault would be based on an RF energy measurement standpoint.

Another approach to detect such a fault may be based on a change in value of a metric between a processing node and other processing nodes. The metric may be referred to as a cross-metric because each processing node may maintain a set of values for the metric between that processing node and other processing nodes.

Figure 7:
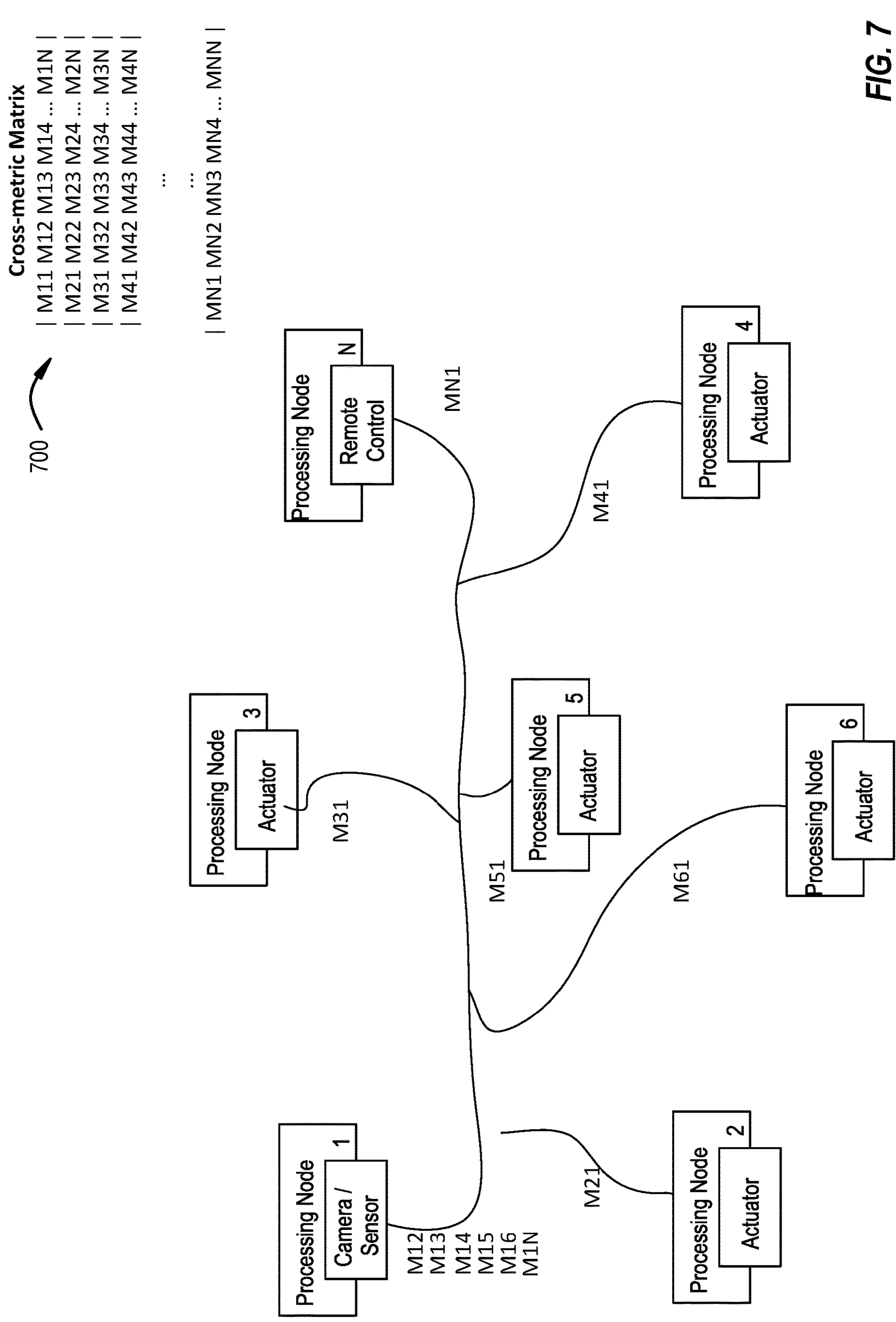
FIG. 7 depicts a diagram illustrating how a break in a link between processing nodes can be detected, in accordance with aspects of the present disclosure

For example, referring to FIG. 7, each processing node may (create and) maintain values of the metric from the perspective of that processing node, that represents a row in a matrix 700. In the illustrated example, processing node 1 maintains N-1 metric values (M12, M13, . . . M1N) for the metric between that processing node with every other processing node in a directional sense. Each entry may be a unique value, measured from the perspective of a particular node. For example, M12 represents a value of the metric as seen (measured/observed) from processing node 1 to processing node 2, while M21 is the same metric as seen from processing node 2 to processing node 1. Each processing node may measure that metric and coming up with the row element for that processing node (Mi1, Mi2, . . . , MN) for processing node i.

Examples of the metric include, but are not limited to, received signal strength indicator (RSSI), signal to noise ratio (SNR), packet error rate (PER), and a distance based on round trip time (RTT) measurement.

If a given processing node i, determines that all its M_i_j (for j=1, N, j!=i) are compromised (e.g., changed a threshold amount or fall outside an expected range), then the node i may determine that it has a fault and may take action to take itself offline (shut itself off) to avoid potentially disrupting other processing nodes.

As an example, if the metric is RSSI, then if all metrics RSSI_i_j, for all j, are <threshold, then this may indicate that process node i is only hearing some highly attenuated signal indicative of a broken connection. Similarly if the metric is distance, if all distance metrics i_j, for all j are out of thresholds (e.g., based on previous link characterizations), this may be indicative of a broken connection causing a change in the RTT measurements.

Example Operations of a Second Multi-Link Device

Figure 8:
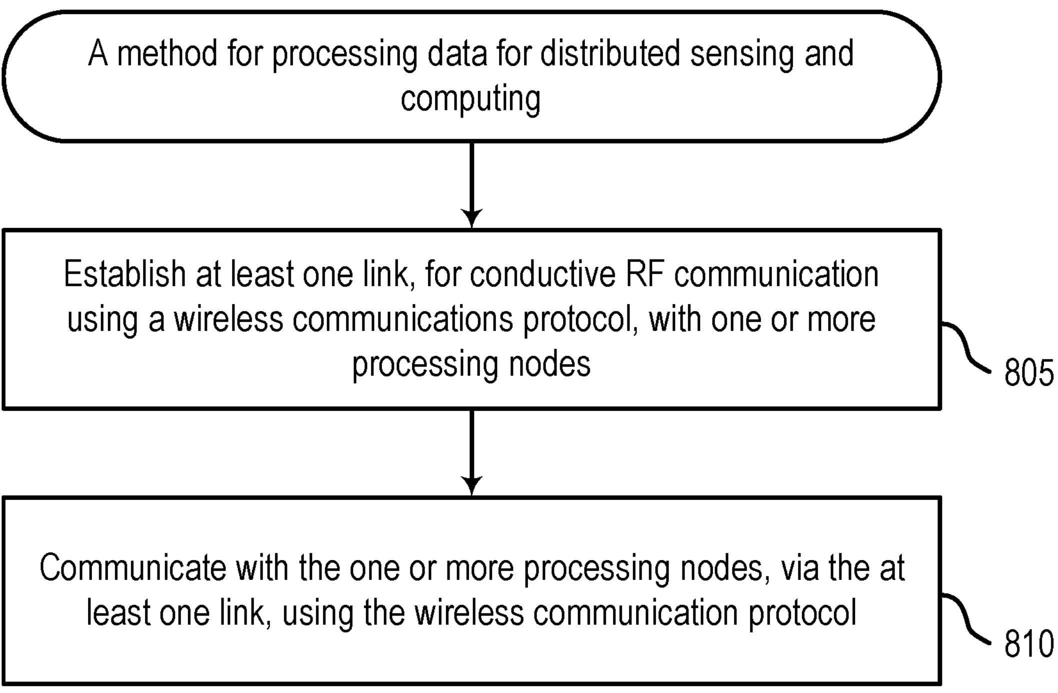
FIG. 8 depicts a method for communications.

FIG. 8 shows an example of a method 800 for processing data at a system. In some examples, the system is the processing system of FIG. 1.

Method 800 begins at step 805 with establishing at least one link, for conductive RF communication using a wireless communications protocol, with one or more processing nodes. In some cases, the operations of this step refer to, or may be performed by, circuitry for establishing and/or code for establishing as described with reference to FIG. 9.

In some aspects, the method 800 further includes communicating with the one or more processing nodes, via the at least one link, using the wireless communication protocol. In some cases, the operations of this step refer to, or may be performed by, circuitry for communicating and/or code for communicating as described with reference to FIG. 9.

Figure 9:
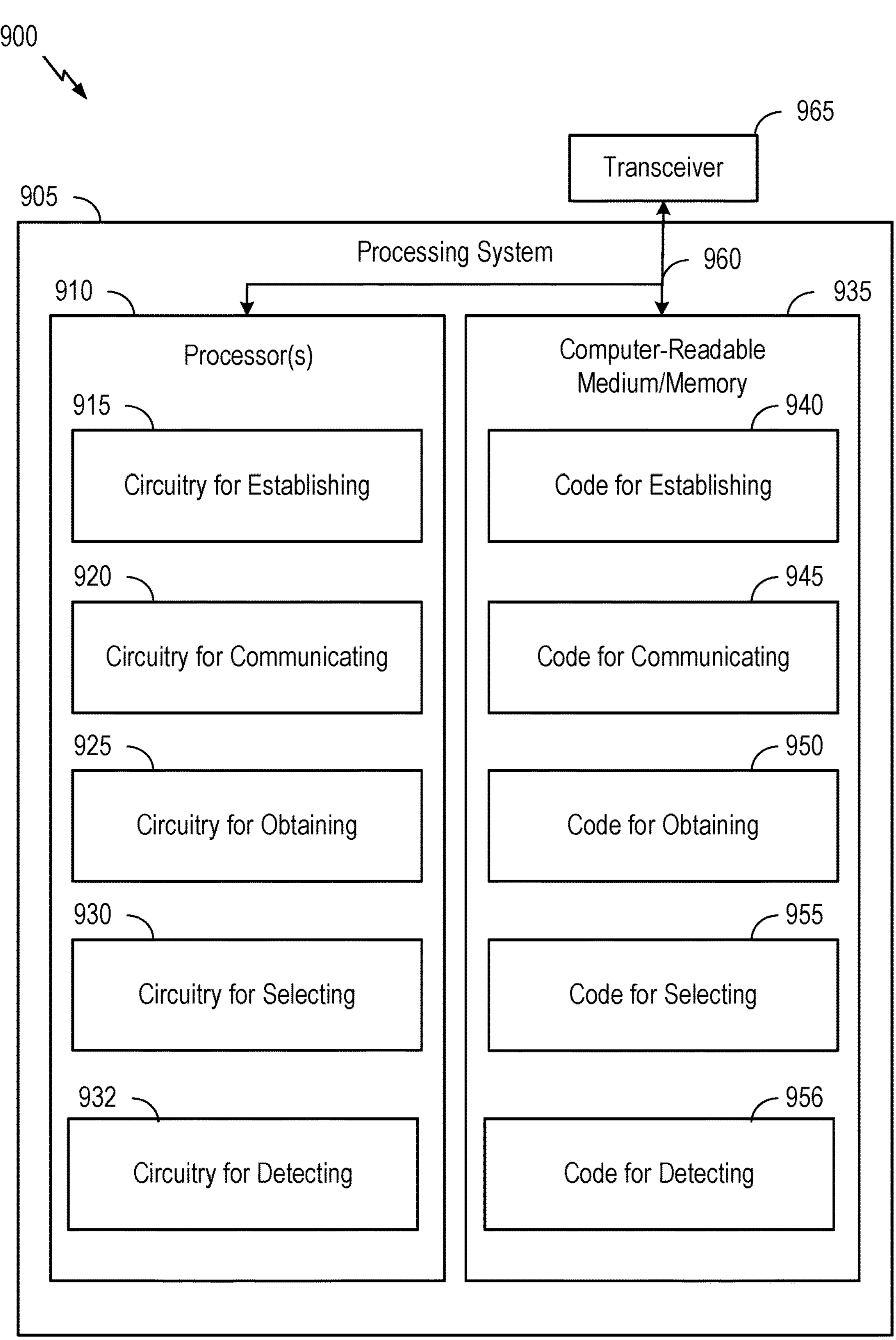
FIG. 9 depicts aspects of an example communications device.

In one aspect, method 800, or any aspect related to it, may be performed by an apparatus, such as communications device 900 of FIG. 9, which includes various components operable, configured, or adapted to perform the method 800. Communications device 800 is described below in further detail.

Note that FIG. 8 is just one example of a method, and other methods including fewer, additional, or alternative steps are possible consistent with this disclosure.

Example Communication Device

FIG. 9 depicts aspects of an example communications device 900. In some aspects, communications device 900 is a system, such as the processing system described above with respect to FIG. 1.

The communications device 900 includes a processing system 960 coupled to the transceiver 965 (e.g., a transmitter and/or a receiver). The transceiver 965 is configured to transmit and receive signals for the communications device 900 such as the various signals as described herein. The transceiver 965 may be an example of aspects of transceiver 222 and/or transceiver 254 described with reference to FIG. 2. The processing system 960 may be configured to perform processing functions for the communications device 900, including processing signals received and/or to be transmitted by the communications device 900.

The processing system 960 includes one or more processors 910. In various aspects, the one or more processors 910 may be representative of the RX data processor 270, the TX data processor 288, the TX spatial processor 290, or the controller 280 of processing node 202b illustrated in FIG. 2. In various aspects, the one or more processors 910 may be representative of one or more of the RX data processor 242, the TX data processor 210, the TX spatial processor 220, or the controller 230 of processing node 202a illustrated in FIG. 2. The one or more processors 910 are coupled to a computer-readable medium/memory 935 via a bus 960. In certain aspects, the computer-readable medium/memory 935 is configured to store instructions (e.g., computer-executable code) that when executed by the one or more processors 910, cause the one or more processors 910 to perform the method 800 described with respect to FIG. 8, or any aspect related to it. Note that reference to a processor performing a function of communications device 900 may include one or more processors 910 performing that function of communications device 900.

In the depicted example, computer-readable medium/memory 935 stores code (e.g., executable instructions), such as code for establishing 940, code for communicating 945, code for obtaining 950, code for selecting 955, and code for detecting 956. Processing of the code for establishing 940, code for communicating 945, code for obtaining 950, and code for selecting 955 may cause the communications device 900 to perform the method 800 described with respect to FIG. 8, or any aspect related to it.

The one or more processors 910 include circuitry configured to implement (e.g., execute) the code stored in the computer-readable medium/memory 935, including circuitry such as circuitry for establishing 915, circuitry for communicating 920, circuitry for obtaining 925, circuitry for selecting 930, and circuitry for detecting 932. Processing with circuitry for establishing 915, circuitry for communicating 920, circuitry for obtaining 925, and circuitry for selecting 930 may cause the communications device 900 to perform the method 800 described with respect to FIG. 8, or any aspect related to it.

Various components of the communications device 900 may provide means for performing the method 800 described with respect to FIG. 8, or any aspect related to it. For example, in some cases, means for transmitting, sending or outputting for transmission may include the transmitter unit 254 of the processing node 202b illustrated in FIG. 2 and/or the transceiver 965 and the of the communications device 900 in FIG. 9. In some cases, means for transmitting, sending or outputting for transmission may include the transmitter unit 222 of processing node 202a illustrated in FIG. 2 and/or the transceiver 965 of the communications device 900 in FIG. 9. In some aspects, means for receiving or obtaining may include the receiver unit 254 of processing node 202c illustrated in FIG. 2 and/or the transceiver 965 of the communications device 900 in FIG. 9. In some aspects, means for receiving or obtaining may include the receiver unit 222 of processing node illustrated in FIG. 2 and/or the transceiver 965 of the communications device 900 in FIG. 9.

Example Clauses

Implementation examples are described in the following numbered clauses:

Clause 1: A system for processing data, comprising: a plurality of processing nodes, each processing node comprising at least one processor and at least one radio frequency (RF) chain; and at least one link for conductive RF communication between or among the processing nodes using a wireless communications protocol.

Clause 2: The system of Clause 1, further comprising: a direct current (DC) blocking circuit coupled with the at least one link.

Clause 3: The system of any one of Clauses 1-2, further comprising: a balanced to unbalanced (balun) circuit coupled with the at least one link.

Clause 4: The system of any one of Clauses 1-3, wherein at least one link is comprised of a coaxial cable or twisted pair of wires.

Clause 5: The system of any one of Clauses 1-4, wherein one or more of the processing nodes comprise a subsystem that includes the at least one processor and at least one RF chain.

Clause 6: The system of any one of Clauses 1-5, wherein: the at least one RF chain comprises a first RF chain and a second RF chain; and the at least one link comprises a first link for conductive RF communication between the processing nodes via the first RF chain and a second link for conductive RF communication between the processing nodes via the second RF chain.

Clause 7: The system of Clause 6, wherein: the first RF chain is configured for conductive RF communication between the processing nodes at a first frequency band; and the second RF chain is configured for conductive RF communication between the processing nodes at the first frequency band or a second frequency band.

Clause 8: The system of any one of Clauses 1-7, wherein: at least one RF chain comprises one or more RF communication devices with RF links capable of operation on multiple frequency bands.

Clause 9: The system of Clause 8, wherein: the processing nodes are reconfigurable to switch from operating on one band of the multiple frequency bands to operating on another band of the multiple frequency bands.

Clause 10: The system of any one of Clauses 6-9 wherein at least one of the processing nodes is configured to send redundant packets on the first and second links.

Clause 11: The system of Clause 10, wherein the redundant packets include markers to identify them as redundant.

Clause 12: The system of any one of Clauses 1-11, wherein the plurality of processing nodes comprise heterogeneous processing nodes.

Clause 13: The system of Clause 12, wherein at least one of the heterogeneous processing nodes comprises: an actuator; a remote control; a sensor; a user interface terminal; or a communication link for interfacing outside the system.

Clause 14: The system of any one of Clauses 1-13, wherein at least one of the plurality of processing nodes is configured to obtain operating power from the at least one link.

Clause 15: The system of any one of Clauses 1-14, wherein at least one of the plurality of processing nodes comprises at least one element to prevent RF energy from reaching power supply circuitry.

Clause 16: The system of Clause 15, wherein the at least one element comprises at least one of an inductor or a ferrite bead.

Clause 17: The system of any one of Clauses 1-16, wherein the plurality of processing nodes are configured to communicate using orthogonal frequency division multiplexed (OFDM) symbols with guard intervals (GIs) that are smaller than GIs used for wireless RF communication.

Clause 18: The system of any one of Clauses 1-17, wherein the plurality of processing nodes are configured to communicate using OFDM symbols with a GI that is less than or equal to a minimum GI defined by the wireless communications protocol.

Clause 19: The system of any one of Clauses 1-18, further comprising a finite impulse response (FIR) filter, wherein a number of taps of the FIR filter is greater than a number of taps associated with wireless RF communications between or among the processing nodes.

Clause 20: The system of any one of Clauses 1-19, wherein the conductive RF communication between the processing nodes involves a subset of one or more modulation and coding schemes (MCS) rates defined by the wireless communications protocol.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "communicating" broadly encompasses a variety of signaling between devices. Communicating may include one or both of receiving (or obtaining) or transmitting (outputting for transmission).

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system, comprising:

a plurality of processing nodes, each processing node comprising at least one processor and at least one radio frequency (RF) chain;

at least one link for conductive RF communication on at least one conductive path between or among the processing nodes using a wireless communications protocol; and at least one balanced to unbalanced (balun) circuit coupled with the at least one link.

2. The system of claim 1, further comprising: a direct current (DC) blocking circuit coupled with the at least one link.

3. The system of claim 1, wherein the at least one link is comprised of a coaxial cable or twisted pair of wires.

4. The system of claim 1, wherein one or more of the processing nodes comprise a subsystem that includes the at least one processor and at least one RF chain.

5. The system of claim 1, wherein:

the at least one RF chain comprises a first RF chain and a second RF chain; and the at least one link comprises a first link for conductive RF communication between the processing nodes via the first RF chain and a second link for conductive RF communication between the processing nodes via the second RF chain.

6. The system of claim 5, wherein:

the first RF chain is configured for conductive RF communication between the processing nodes at a first frequency band; and the second RF chain is configured for conductive RF communication between the processing nodes at the first frequency band or a second frequency band.

7. The system of claim 5 wherein at least one of the processing nodes is configured to send redundant packets on the first and second links.

8. The system of claim 7, wherein the redundant packets include markers to identify them as redundant.

9. The system of claim 1, wherein:

at least one RF chain comprises one or more RF communication devices with RF links capable of operation on multiple frequency bands.

10. The system of claim 9, wherein:

the processing nodes are reconfigurable to switch from operating on one band of the multiple frequency bands to operating on another band of the multiple frequency bands.

11. The system of claim 1, wherein the plurality of processing nodes comprise heterogeneous processing nodes.

12. The system of claim 11, wherein at least one of the heterogeneous processing nodes comprises:

an actuator;

a remote control;

a sensor;

a user interface terminal; or a communication link for interfacing outside the system.

13. The system of claim 1, wherein at least one of the plurality of processing nodes is configured to obtain operating power from the at least one link.

14. The system of claim 1, wherein at least one of the plurality of processing nodes comprises at least one element to prevent RF energy from reaching power supply circuitry.

15. The system of claim 14, wherein the at least one element comprises at least one of an inductor or a ferrite bead.

16. The system of claim 1, wherein the plurality of processing nodes are configured to communicate using orthogonal frequency division multiplexed (OFDM) symbols with guard intervals (GIs) that are smaller than GIs used for wireless RF communication.

17. The system of claim 1, wherein the plurality of processing nodes are configured to communicate using OFDM symbols with a GI that is less than or equal to a minimum GI defined by the wireless communications protocol.

18. The system of claim 1, further comprising a finite impulse response (FIR) filter, wherein a number of taps of the FIR filter is greater than a number of taps associated with the wireless communications protocol.

19. The system of claim 1, wherein the conductive RF communication between the processing nodes involves a subset of one or more modulation and coding schemes (MCS) rates defined by the wireless communications protocol.

20. A system, comprising:

a plurality of processing nodes, each processing node comprising at least one processor and at least one radio frequency (RF) chain; and at least one link for conductive RF communication on at least one conductive path between or among the plurality of processing nodes using a wireless communications protocol, wherein at least one of the plurality of processing nodes is configured to:

measure one or more metrics associated with the at least one link between the at least one of the plurality of processing nodes and one or more others of the plurality of processing nodes; and detect a fault based on a change in the one or more metrics.

21. The system of claim 20, further comprising:

at least one balanced to unbalanced (balun) circuit coupled with the at least one link.

22. The system of claim 20, wherein the one or more metrics comprise at least one of:

received signal strength indicator (RSSI);

signal to noise ratio (SNR);

packet error rate (PER); or a distance based on packet round trip time (RTT) measurements.

23. An apparatus, comprising:

at least one RF chain;

at least one memory comprising instructions; and at least one processor configured to execute the instructions to cause the apparatus to:

establish at least one link, for conductive RF communication on at least one conductive path using a wireless communications protocol, with one or more processing nodes;

communicate with the one or more processing nodes, via the at least one link, using the wireless communication protocol;

measure one or more metrics associated with the at least one link between the apparatus and the one or more processing nodes; and detect a fault based on a change in the one or more metrics.

24. The apparatus of claim 23, further comprising:

a balanced to unbalanced (balun) circuit coupled with the at least one link.

* * * * *